United States Patent
Doherty et al.

(10) Patent No.: US 8,195,144 B2
(45) Date of Patent: Jun. 5, 2012

(54) METHOD FOR RESETTING A NON-RESPONSIVE MOBILE UNIT THEN-CURRENTLY OCCUPYING A CELLULAR TRAFFIC CHANNEL OF A WIRELESS NETWORK

(75) Inventors: James Doherty, Wyandotte, MI (US); Michael J. Blanck, Clarkston, MI (US)

(73) Assignee: General Motors LLC, Detroit, MI (US)

( * ) Notice: Subject to any disclaimer, the term of this patent is extended or adjusted under 35 U.S.C. 154(b) by 233 days.

(21) Appl. No.: 12/755,945

(22) Filed: Apr. 7, 2010

(65) Prior Publication Data

US 2011/0250876 A1 Oct. 13, 2011

(51) Int. Cl.
*H04M 3/00* (2006.01)
(52) U.S. Cl. ........................................ 455/419; 455/466
(58) Field of Classification Search .................. None
See application file for complete search history.

(56) References Cited

U.S. PATENT DOCUMENTS

| | | | |
|---|---|---|---|
| 5,812,636 A * | 9/1998 | Tseng et al. | 455/423 |
| 6,151,497 A | 11/2000 | Yee et al. | |
| 6,223,032 B1 * | 4/2001 | Cuffaro | 455/425 |
| 6,301,484 B1 | 10/2001 | Rogers et al. | |
| 6,915,126 B2 | 7/2005 | Mazzara, Jr. | |
| 7,292,848 B2 | 11/2007 | Mazzara, Jr. et al. | |
| 7,398,082 B2 | 7/2008 | Schwinke et al. | |
| 7,532,859 B2 | 5/2009 | Videtich | |
| RE42,981 E * | 11/2011 | Cho | 455/466 |
| 2003/0139173 A1 | 7/2003 | Mazzara, Jr. et al. | |
| 2003/0211854 A1 | 11/2003 | Mazzara, Jr. | |
| 2004/0012501 A1 | 1/2004 | Mazzara et al. | |
| 2004/0023647 A1 | 2/2004 | Mazzara, Jr. et al. | |
| 2004/0162070 A1 * | 8/2004 | Baral et al. | 455/435.1 |
| 2005/0068169 A1 * | 3/2005 | Copley et al. | 340/539.13 |
| 2006/0046649 A1 | 3/2006 | Videtich | |
| 2006/0052092 A1 | 3/2006 | Schwinke et al. | |
| 2007/0244628 A1 | 10/2007 | Rockett et al. | |
| 2010/0167727 A1 * | 7/2010 | Madhavan et al. | 455/434 |
| 2010/0190515 A1 * | 7/2010 | Sharma et al. | 455/466 |
| 2010/0203907 A1 * | 8/2010 | Kim | 455/466 |
| 2011/0083128 A1 * | 4/2011 | Hoch et al. | 717/174 |

* cited by examiner

*Primary Examiner* — Rafael Pérez-Gutiérrez
*Assistant Examiner* — German Viana Di Prisco
(74) *Attorney, Agent, or Firm* — Dierker & Associates, P.C.

(57) ABSTRACT

A method for resetting a non-responsive mobile unit then-currently occupying a cellular traffic channel of a wireless network is disclosed herein. The method involves recognizing, at an external entity, that the mobile unit is in a non-responsive state that is occupying a voice channel of the cellular traffic channel, and establishing a wireless data connection between the mobile unit and an external entity over the cellular traffic channel. A data message is transmitted to the mobile unit from the external entity, where the data message includes at least a command to reset the mobile unit. In response to receiving the data message, the method further involves resetting the mobile unit via a protocol initiated by a processor associated with the mobile unit.

13 Claims, 2 Drawing Sheets

METHOD FOR RESETTING A NON-RESPONSIVE MOBILE UNIT THEN-CURRENTLY OCCUPYING A CELLULAR TRAFFIC CHANNEL OF A WIRELESS NETWORK

TECHNICAL FIELD

The present disclosure relates generally to methods for resetting a non-responsive mobile unit then-currently occupying a cellular traffic channel of a wireless network.

BACKGROUND

A vehicle dedicated communications device (such as, e.g., a telematics unit) may be used as a suitable communications link between a call center or another party and a subscriber vehicle. The telematics unit may, for example, be used to request particular services from the call center, to send requested data to the call center, and/or the like. In some cases, the telematics unit may also be used to communicate with other telematics-equipped subscriber vehicles or other telecommunication devices.

SUMMARY

A method for resetting a non-responsive mobile unit then-currently occupying a cellular traffic channel of a wireless network is disclosed herein. The method involves recognizing, at an external entity, that the mobile unit is in a non-responsive state that is occupying a voice channel of the cellular traffic channel, and establishing a wireless data connection between the mobile unit and an external entity over the cellular traffic channel. The data message includes at least a command to reset the mobile unit. In response to receiving the data message from the external entity, the method further involves resetting the mobile unit via a protocol initiated by a processor associated with the mobile unit.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
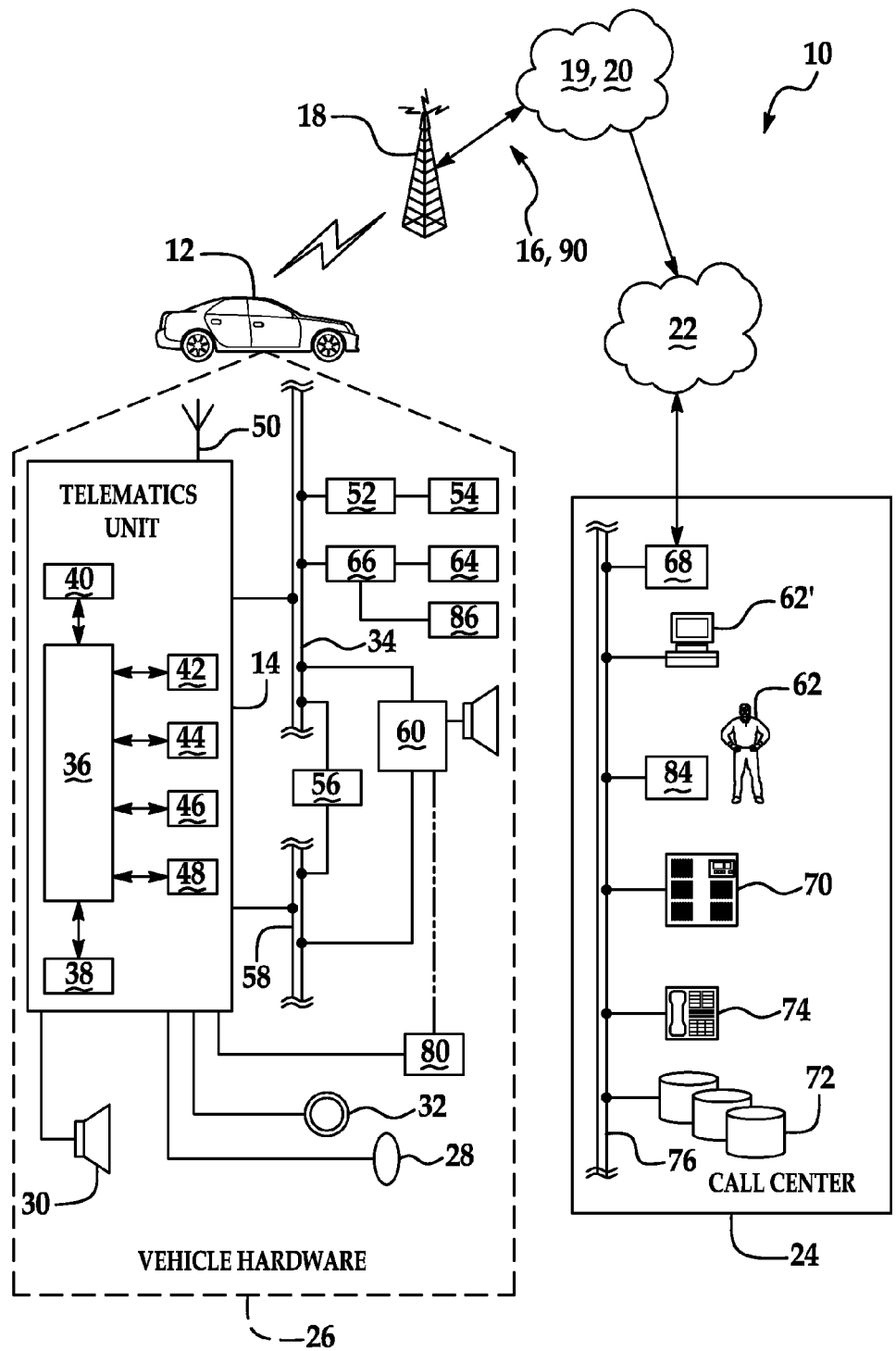
FIG. 1 is a schematic diagram depicting an example of a system for resetting a non-responsive mobile unit then-currently occupying a cellular traffic channel of a wireless network.

Communication established between a vehicle dedicated communications device (such as a telematics unit) and another entity (e.g., the call center) are accomplished using a cellular traffic channel, where both voice communications and data communications are supported by a wireless communications network. In an example, a voice communication includes a circuit-switched call, where such call is made using a circuit-switch channel. When such a circuit-switch call is made during the course of normal voice call operations, the device can enter a state in which it malfunctions. This state is referred to as a non-responsive state, during which the device continuously attempts (not at the direction of an in-vehicle user) to make circuit-switched calls that are repeatedly unsuccessful. Such repeatedly unsuccessful calling attempts can occupy or even seize network resources (e.g., PPP sessions, IP addresses, etc.) of the channel that would otherwise be available for other devices. Another example of a non-responsive state is a dead call in which the other party has hung up, but the mobile device continues to occupy the channel. In these non-responsive states, the device is referred to as "being locked in a cellular state," where the device is typically non-responsive when a telephony connection is attempted therewith over the channel. In other words, a "non-responsive device" includes one that is attempting to make or is making (on its own without direction from an in-vehicle user), but cannot receive voice calls over the cellular traffic channel. As such, the non-responsive device is occupying the telephony connection/voice channel of the cellular traffic channel. After a certain amount of time, the network provider supporting the voice channel (e.g., VERIZON WIRELESS®, SPRINT®, etc.) may, at its own discretion, locate and disable the device attempting to make the voice calls on, or otherwise occupying, its network channels, and then such device can no longer use the voice channel at all. The non-responsive device must therefore be reset so that the device can resume normal calling operations. The method disclosed herein involves resetting the device prior to the disabling of the device by the network provider. This may be particularly useful because, in some instances, a device may not be able to be reset by the network provider, even when a cleared number is used.

Accordingly, example(s) of the method as disclosed herein may advantageously be used to reset a non-responsive device that is then-currently occupying a voice channel of a wireless network. This is accomplished by establishing a data connection with the non-responsive device using the same cellular traffic channel being then-currently occupied by the mobile unit. The data connection enables an external entity (e.g., a call center) to successfully transmit a data message to the non-responsive device. In an example, the data message includes at least a command to reset the device via a protocol executable by a processor associated with the device. Once the device is reset, it may then resume normal voice calling operations using, e.g., the previously-occupied voice channel.

It is to be understood that, as used herein, the term "user" includes a vehicle owner, operator, and/or passenger. It is further to be understood that the term "user" may be used interchangeably with the term subscriber/service subscriber.

Further, a "cellular traffic channel" is a communications channel having a bandwidth sufficient to carry voice frequencies (where such voice frequencies are intelligible by a receiving party) that is supported by a designated network provider. The cellular traffic channel can carry a variety of traffic types, including, high or regular speed circuit-switch voice calls, one time (i.e., 1×) data sessions, evolution-data optimized (EvDO) connections, and/or the like. It is to be understood that, as used herein, the phrase "cellular traffic channel", when referring to voice calls, may be used interchangeably with the phrases voice channel, calling channel, or circuit-switched calling channel. The cellular traffic channel may also be capable of transmitting data messages while the device is occupying the channel for other purposes (e.g., attempting voice calls while in a non-responsive state).

Additionally, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Also, the term "communication" is to be construed to include all forms of communication, including direct and indirect communication. As such, indirect communication may include communication between two components with additional component(s) located therebetween.

It is to be understood that the examples of the method disclosed herein may be performed for resetting any mobile unit or device occupying a cellular traffic channel. Some non-limiting examples of such mobile units/devices include vehicle dedicated communication units/devices, cellular phones, personal digital assistants, and/or the like. For purposes of illustration, the examples of the method will be described hereinbelow for use in conjunction with a vehicle dedicated communications unit, such as a telematics unit (identified by reference numeral 14 in FIG. 1), that is operatively disposed in a vehicle (identified by reference numeral 12 in FIG. 1).

Furthermore, the resetting of the telematics unit 14 may be initiated by a data message sent from an external entity. Examples of external entities include a call center 24 (identified by reference numeral 24 in FIG. 1), a third party facility (i.e., a facility other than the call center 24 that the telematics unit 14 may establish a voice or data connection with), and/or another mobile unit (such as a telematics unit disposed in another subscriber vehicle). This system is considered to be an example of a system 10 for resetting a non-responsive mobile unit, and such system 10 will be described in detail below at least in conjunction with FIG. 1.

Referring now to FIG. 1, the system 10 includes the vehicle 12, the telematics unit 14, a carrier/communication system 16 (including, but not limited to, one or more cell towers 18, one or more base stations 19 and/or mobile switching centers (MSCs) 20, and one or more service providers (not shown)), one or more land networks 22, and one or more call centers 24. In an example, the carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 (also referred to herein as a processor 36) may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. In an example, the processor 36 is configured to run software programs or routines that include computer readable code for performing various steps for resetting the telematics unit 14 when such unit is locked in a cellular state (i.e., the unit 14 is non-responsive).

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 may include a vehicle data upload (VDU) system (not shown), which is configured to receive raw vehicle data from the bus 34, packetize the data, and upload the packetized raw data to the call center 24 (or other external entity). The VDU is operatively connected to the processor 36 of the telematics unit 14, and thus is in communication with the call center 24 via the bus 34 and the carrier/communication system 16. The VDU may be the telematics unit's central data system that can include a modem, a processor, and an on-board database. The database can be implemented using a separate network attached storage (NAS) device or be located elsewhere, such as in memory 38, as desired. The VDU system has an application program that handles all of the vehicle data upload processing, including communication with the call center 24 and the setting and processing of triggers which initiate a data upload event.

The telematics unit 14 provides numerous services, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with carrier system 16 such that both voice and data transmissions may be sent and received over the voice channel. In an example, the voice channel is a cellular traffic channel operated by a circuit-switch network. Vehicle communications are enabled via the cellular chipset/component 40 for voice communications and the wireless modem 42 for data transmission. In order to enable successful data transmission over the cellular traffic channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain the vehicle data for use by the telematics unit 14 or the call center 24 to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, and a single base station 19 may be coupled to various cell towers 18 or various base stations 19 could be coupled with a single MSC 20. A speech codec or vocoder may also be incorporated in one or more of the base stations 19, but depending on the particular architecture of the network 16, it could be incorporated within an MSC 20 or some other network components as well.

Land network 22 may be a conventional land-based telecommunications network that is connected to one or more landline telephones and connects the wireless components of the carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks such as wireless local networks (WLANs) or networks providing broadband wireless access (BWA), or any combination thereof.

The call center 24 (which is an example of the external entity that may establish voice and/or data connections with the telematics unit 14) is designed to provide the vehicle hardware 26 with a number of different system back-end functions. According to the example shown here, the call center 24 generally includes one or more switches 68, servers 70, databases 72, live and/or automated advisors 62, 62', a processor 84, as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs configured to accomplish a variety of call center 24 functions. More particularly, the various operations of the call center 24 are carried out by one or more computers (e.g., computer equipment 74) programmed to carry out the tasks of the method(s) disclosed herein. The computer equipment 74 (including computers) may include a network of servers (including server 70) coupled to both locally stored and remote databases (e.g., database 72) of any information processed.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

The database(s) 72 may be designed to store subscriber profile records, subscriber behavioral patterns, or any other pertinent subscriber information.

It is to be appreciated that the call center 24 may be any central or remote facility, manned or unmanned, mobile or fixed, to or from which it is desirable to exchange voice and data communications. Furthermore, in some instances, the call center 24 is a data center that receives voice or data calls, analyzes the request associated with the voice or data call, and transfers the call to an application specific call center (not shown). It is to be understood that the application specific call center may include all of the components of the call center 24, but is a dedicated facility for addressing specific requests, needs, etc. Examples of such application specific call centers are emergency services call centers, navigation route call centers, in-vehicle function call centers, or the like.

Furthermore, a cellular service or network provider 90 generally owns and/or operates the carrier/communication system 16. It is to be understood that, although the cellular service provider 90 may be located at the call center 24, the call center 24 is a separate and distinct entity from the cellular service provider. In an example, the cellular service provider is located remote from the call center 24 (as shown in FIG. 1). A cellular service provider provides the user with telephone and/or Internet services, while the call center 24 is a telematics service provider. The cellular service provider is generally a wireless carrier (such as, for example, VERIZON WIRELESS®, AT&T®, SPRINT®, etc.). It is to be understood that the cellular service provider may interact with the call center 24 to provide various service(s) to the user.

To reiterate from above, the non-responsive telematics unit 14 is a unit that is then-currently occupying a cellular traffic channel of, e.g., the network provider 90, and such non-responsive telematics unit 14 cannot be reached, via a voice call, over the occupied channel, by any external entity (such as the call center 24). The examples of the method disclosed herein may be used to establish a data connection with the telematics unit 14 even when such unit is in the non-responsive state, and during such data connection, instruct the telematics unit 14 to reset itself. Upon resetting itself, the telematics unit 14 can then resume normal voice calling operations using the previously occupied cellular traffic channel.

Figure 2:
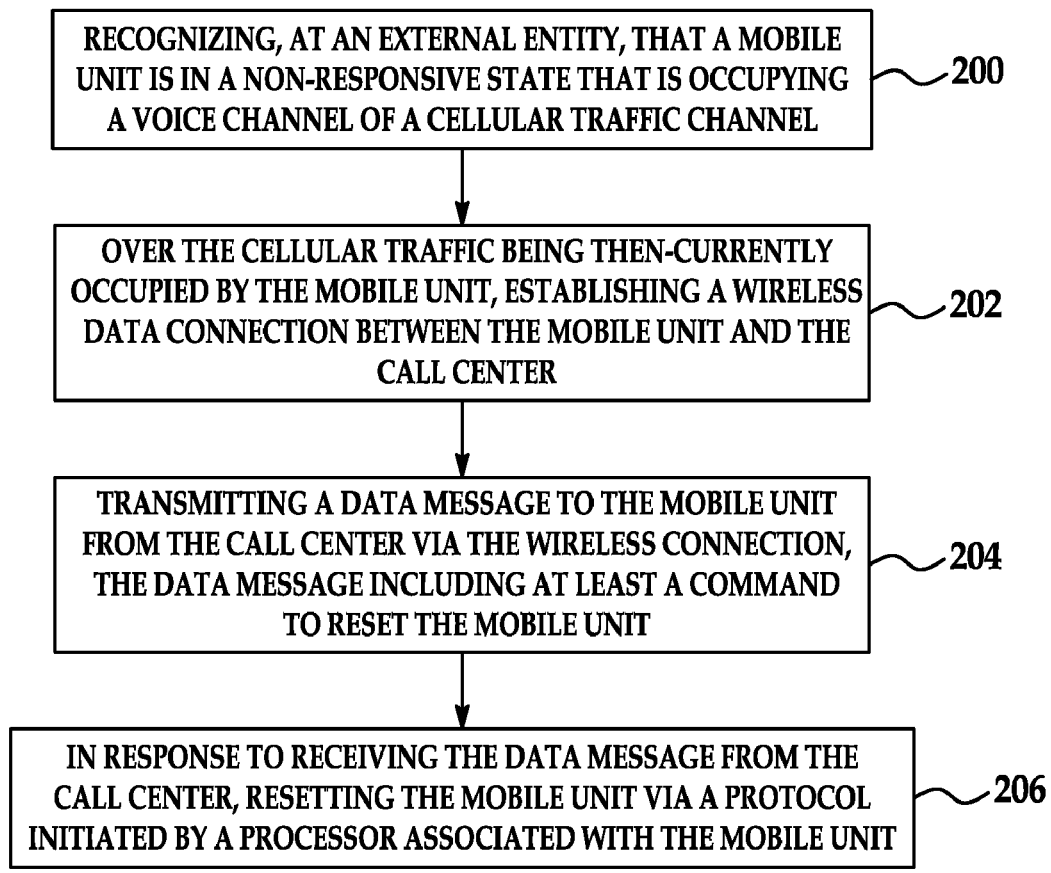
FIG. 2 is a flow diagram depicting an example of a method for resetting a non-responsive mobile unit then-currently occupying a cellular traffic channel of a wireless network.

Referring now to FIG. 2, an example of the method includes recognizing that the mobile unit (e.g., telematics unit 14) is in a non-responsive state that is occupying a voice channel of a cellular traffic channel (as shown at reference numeral 200). In an example, recognizing that the telematics unit 14 is in a non-responsive state may be accomplished when the call center 24 cannot establish a connection with the device 14 even though such device 14 is then-currently registered and is considered to be in an active state. Recognition of the non-responsive state of the telematics unit 14 may also or otherwise by accomplished, for example, by reviewing, at the call center 24, automated status reports provided by the wireless network provider 90. In yet another example, the recognizing may be accomplished in response to one or more complaints that the telematics unit 14 is then-currently seizing resources on the network channel, or is then-currently crashing a base station, or some other like complaint. Such complaints may be received from, e.g., a person employed by or associated with the network provider 90 or via an automated message transmitted by computer systems of the network provider 90.

Once the non-responsive state of the telematics unit 14 is recognized, the method further includes establishing a wireless data connection between the non-responsive telematics unit 14 and the external entity (e.g., the call center 24), where such data connection is made over the cellular traffic channel being then-currently occupied by the telematics unit 14 (as shown by reference numeral 202). The wireless data connection can be established simultaneously with the voice connection (i.e., a wireless telephony connection) that the non-responsive unit 14 is attempting to make or has made on the same cellular traffic channel. Thus, the data connection may be used to transmit a data message to the telematics unit 14 even if the telematics unit 14 is then-currently engaged in a separate voice (e.g., circuit-switch) call. Accordingly, the wireless data connection established between the telematics unit 14 and the call center 24 when the telematics unit 14 is otherwise in a non-responsive state is a separate and distinct connection from the voice connection (i.e., a wireless telephony connection) that the telematics unit 14 is otherwise engaged in or attempting to engage in.

Non-limiting examples of wireless data connections include those supporting databurst messaging (e.g., short message service (SMS) messaging), proprietary over-the-air messaging, messaging using circuit-switched calls (e.g., application integration framework (AIF)), and messaging using web service definition language (WSDL) (e.g., packet data calls, WiFi, or the like). Each of these connections may be made over the cellular traffic channel.

Still referring to FIG. 2, once the wireless data connection has been established, the method further includes transmitting a data message to the telematics unit 14 from the call center 24 via the wireless data connection (as shown by reference numeral 204). In an example, the data message is a databurst message, a proprietary over-the-air message, a circuit-switched call message, or a WSDL message, and such data message includes at least a command to reset the telematics unit 14. The data message may be generated by the processor 84 at the call center 24 executing suitable software routines for generating such messages.

In an example, the data message transmitted to, and received by the telematics unit 14, is configured to enable the telematics unit 14 to recognize the data message as a command to reset the unit 14. Likewise, the telematics unit 14 is also configured (e.g., with suitable software program(s)) to recognize the data message as a request to reset the device 14. For instance, the data message may include a header field containing any information that identifies the data message as being a command to reset the telematics unit 14, and such information is recognizable by the telematics unit 14 as a reset command. In an example, the header may include a line of text including a command to reset the device 14 followed by information identifying the device 14. For instance, the header may recite, "RESET DEVICE NO. 123456", where the identification information includes "DEVICE NO. 123456" and the reset command is the word "RESET". In another example, the information may be sent in binary form, such that all of the desirable information is stored within the binary encoded payload. Upon recognizing that the identification information contained in the message matches the identification of the telematics unit 14, and telematics unit 14 also recognizes the word "RESET" as a trigger to power down and then restart the device.

In some cases, the header may include other fields including, for example, one or more additional commands. For example, such additional command may include a command for the device 14 to stop making voice calls over the occupied cellular traffic network. Such command may be part of the header, such as "STOP SENDING CALLS, AND RESET DEVICE NO. 123456".

In an example, the data message may also have embodied therein a protocol for resetting the device 14. Such protocol may include software commands that are executable by the processor 36 associated with the telematics unit 14 for resetting the unit 14. In an example, upon recognizing the header of the message as being a reset command for the device 14, the processor 36 automatically reviews the data message for any additional information pertaining to the resetting command. The additional information may include, for instance, the protocol for the resetting of the device 14, and such additional information may be extracted from the data message by the processor 36.

In instances where the protocol is not included in the data message, upon receiving the reset command, the telematics unit 14 may apply a reset protocol previously stored therein. Such previously stored protocol may, in an example, have been installed in the telematics unit 14 by the manufacturer when such device was made. The previously stored protocol may have also been downloaded from the call center 24 during or as a result of activating and registering the device with the call center 24.

It is to be understood that when the telematics unit 14 recognizes the received data message as including a reset command, the processor 36 associated with the telematics unit 14 automatically initiates the resetting process.

The reset command included in the data message may, in an example, be a command for a single reset of the device 14. The command may also include a watchdog timer that, when extracted from the message by the processor 36, forces a reset of the telematics unit 14 each time the telematics unit 14 appears to be locked in a cellular state. In this later instance, upon recognizing, by the processor 36, that the telematics unit 14 cannot make a successful voice connection with an external entity after a prescribed number of attempts, the watchdog timer automatically initiates resetting of the telematics unit 14. Once the telematics unit 14 has been reset, the call center 24 will be notified (by, e.g., sending a message to the call center 24 from the telematics unit 14) of the same. Such notification may be used, by the call center 24, so that a data message including a reset command is not automatically transmitted to the device 14.

In response to receiving the original data message from the call center 24, resetting of the telematics unit 14 may be accomplished via the reset protocol either identified in the message or a default protocol stored in the telematics unit 14 (as shown by reference numeral 206 in FIG. 2). In an example, the reset protocol includes the processor 36 running a restart algorithm which forces the telematics unit 14 to power down, wait a predetermined time, and then restart. The powering down releases the network resources being then-currently occupied by the non-responsive telematics unit 14. After waiting the predetermined amount of time (e.g., 10 seconds, 30 seconds, etc.), the processor 36 is configured to then re-power itself and thus the telematics unit 14.

Once the telematics unit 14 has been successfully re-powered, the telematics unit 14 transmits another data message back to the call center 24 via the data connection over the cellular traffic channel, where such other data message indicates that the protocol for resetting the telematics unit 14 has been completed. In this example, the other data message may be sent using either the cellular traffic channel or the data connection that supports at least one of short message service (SMS) messaging, proprietary over-the-air messaging, messaging using application integration framework (AIF), and messaging using web service definition language (WSDL). Such data message may be used, by the call center 24, as verification that the telematics unit 14 has in fact been reset.

In another example, upon receiving the data message from the call center 24, the telematics unit 14 transmits another data message back to the call center 24 via the data connection over the cellular traffic channel, where such other data message indicates that the protocol for resetting the telematics unit 14 has been initiated. In this example, the other data message may be sent using the data connection that supports at least one of a databurst message, a proprietary over-the-air message, a circuit-switched call message, or a WSDL message. Such data message may be used, by the call center 24, as a verification that the telematics unit 14 has in fact received and processed the data message containing the reset command. In some cases, the call center 24 may send a subsequent data message to the telematics unit 14 to check that the protocol is complete and the device 14 has been successfully reset. Such data message may include a command to have the telematics unit 14 call the call center 24 via a voice connection over the previously occupied traffic calling channel, and if such call is successful, the telematics unit 14 is considered to be reset. In instances where the reset protocol is not working, in response to the subsequent data message, the telematics unit 14 may send a response message to the call center 24 requesting a new or updated protocol. Such process continues until the device 14 has been successfully reset.

The method further includes re-registering the telematics unit 14 with the wireless network 90. In an example, re-registering of the telematics unit 14 is accomplished via an automatic process controlled by the telematics unit 14 operating on one of a code division multiple access (CDMA) standard, a global system for mobile communications (GSM), a evolution-data optimized communications (EvDO) system, a long term evolution (LTE) communications system, any other system supporting SMS messaging and/or proprietary Air InterFace, and/or combinations thereof. The automatic process may be a Telecommunications Industry Association (TIA) defined registration process such as, e.g., TIA/IS 2000. According to such process, upon re-powering of the device 14, the telematics unit 14 must re-register with the network provider 90. For example, the telematics unit 14, upon being re-powered, will automatically attempt to conduct a registration with the network provider 90 by attempting to place an authenticated call, for example, to the call center 24. The network provider 90 performs a registration check to ensure that the telematics unit 14 is registered with the provider 90 before connecting the authenticated call. Each cellular device, such as the telematics unit 14, has an embedded electronic serial number (ESN) that is assigned to the cellular device by the manufacturer. The network provider 90 assigns a mobile identification number (MIN) to the cellular device. The network provider 90 maintains a listing of all of the ESNs of the cellular devices registered with that network provider 90, and also maintain a listing of all of the assigned MINs and the specific ESNs associated with each of the assigned MINs. During the registration process, the network provider 90 compares the telematics unit ESN (received with the call attempt) with the telematics unit MIN. The carrier/communication system 16 transmits a handshake back to the wireless modem 42 of the telematics unit 14 when the network provider 90 confirms registration of the telematics unit 14, and the authenticated communication channel is established between the telematics unit 14 and the call center 24.

It is to be understood that it is generally not uncommon for a mobile unit such as a telematics unit 14 to get locked in a cellular state. Thus, over its lifetime, the mobile unit may be instructed to reset itself a number of times. It is therefore desirable to generate a record of each reset command sent to the mobile unit 14. In an example, the record may be stored in mobile unit (e.g., in the memory 38 of the telematics unit 14). Such record may include, e.g., a count of a number of requests sent by the call center 24 to reset the mobile unit 14. In some cases, the record may also include a GPS timestamp of when each reset was initiated. Such timestamp may be useful, for example, in diagnostic and/or trouble-shooting situations, where the timestamp may be used to identify certain network conditions that may cause the device 14 to lock up and/or prevent such device 14 from being reset.

Such a count may be used to determine a history of the calling behavior of the device 14, where such history may be useful during servicing of the device 14 and/or to diagnose i) particular problems and/or issues that the telematics unit 14 may then-currently be experiencing, ii) systematic problems with the device 14 in instances where the device 14 continuously hangs up, makes calls, etc., and/or iii) potential problems with the network provider 90. Such history may also be useful in preventing the network provider 90 from completely disabling the non-responsive device 14 if such record can show a good faith effort in attempting to correct the problem. In any of such cases stated above, a request to review the record may be initiated by the call center 24 and/or the network provider 90. Such request may be accomplished, for example, by transmitting another data message to the telematics unit 14, where such data message includes a command to enable the call center 24 or the network provider 90 to review the record. In some instances, the data message from the call center 24 or network provider 90 may also include a command to reset the count of the number of requests included in the record. In yet other instances, the data message may include both a request for the record and to reset the count. Such commands may trigger a vehicle data upload event during which the record is transmitted via a packet data session to the requesting entity. The telematics unit 14 may also transmit a data message back to the call center 24 and/or network provider 90 indicating that the requests/commands have been complied with.

While several examples have been described in detail, it will be apparent to those skilled in the art that the disclosed examples may be modified. Therefore, the foregoing description is to be considered exemplary rather than limiting.

The invention claimed is:

1. A method for resetting a non-responsive telematics unit operatively disposed in a mobile vehicle, the telematics unit then-currently occupying a cellular traffic channel of a wireless network, the method comprising:
   recognizing, at a call center, that the telematics unit is in a non-responsive state that is occupying a voice channel of the cellular traffic channel;
   over the cellular traffic channel, establishing a wireless data connection between the telematics unit and the call center;
   transmitting a data message to the telematics unit from the call center via the wireless data connection, the data message including at least a command to reset the telematics unit; and
   in response to receiving the data message from the call center, resetting the telematics unit via a protocol initiated by a processor operatively associated with the telematics unit.

2. The method as defined in claim 1 wherein the data message is selected from a short messaging service (SMS) message, a propriety over-the-air message, an application integration framework (AIF) message, or a web service definition language (WSDL) message.

3. The method as defined in claim 1 wherein in response to the receiving of the data message from the call center, the method further comprises transmitting an other data message to the call center that the protocol for resetting the telematics unit has been completed.

4. The method as defined in claim 1 wherein the protocol for resetting the telematics unit includes:
   powering down the telematics unit, thereby releasing network resources being then-currently occupied by the telematics unit;
   re-powering the telematics unit after the telematics unit has been powered down; and then
   re-registering the telematics unit with the wireless network.

5. The method as defined in claim 4 wherein the re-registering of the telematics unit with the wireless network is accomplished via an automatic process controlled by the telematics unit operating on a code division multiple access (CDMA) standard, a global system for mobile communications (GSM), an evolution-data optimized communications (EvDO) system, a long term evolution (LTE) communications system, a system supporting SMS messaging and/or proprietary AIF, and/or combinations thereof.

6. The method as defined in claim 1, further comprising:
   generating a record of the resetting of the telematics unit, the record including a count of a number of requests by the center to reset the telematics unit; and
   storing the record in an electronic memory operatively associated with the telematics unit.

7. The method as defined in claim 6 wherein the record includes a GPS timestamp of when the resetting was initiated.

8. The method as defined in claim 6, further comprising:
   transmitting an other data message to the telematics unit from the call center via the wireless data connection, the other data message including a command to i) enable the call center to review the record, ii) to reset the count of the number of requests included in the record, or iii) combinations thereof; and
   via the telematics unit, responding to the other data message.

9. A system for resetting a non-responsive telematics unit operatively disposed in a mobile vehicle, the telematics unit then-currently occupying a cellular traffic channel of a wireless network, the system comprising:
   a telematics unit that is in a non-responsive state that occupies a voice channel of the cellular traffic channel;
   a call center wirelessly connected to the telematics unit over the cellular traffic channel;
   a data message configured to be sent from the call center to the telematics unit over a wireless data connection of the cellular traffic channel, the data message including a reset command; and
   a processor operatively associated with the telematics unit, the processor being configured to run computer readable program code for resetting the telematics unit in response to receiving the data message from the call center.

10. The system as defined in claim 9 wherein the data message is selected from a short messaging service (SMS) message, a propriety over-the-air message, an application integration framework (AIF) message, or a web service definition language (WSDL) message.

11. The system as defined in claim 9 wherein the computer readable program code for resetting the telematics unit includes:
    computer readable program code for powering down the telematics unit, thereby releasing network resources being then-currently occupied by the telematics unit;
    computer readable program code for re-powering the telematics unit after the telematics unit has been powered down; and
    computer readable program code for re-registering the telematics unit with the wireless network.

12. The system as defined in claim 9 wherein the processor includes computer readable code for generating a record of the resetting of the telematics unit, the record including a count of a number of requests by the call center to reset the telematics unit, and wherein the system further comprises an electronic memory operatively associated with the telematics unit, the electronic memory configured to store the record therein.

13. The system as defined in claim 12 wherein the record includes a GPS timestamp of when the resetting was initiated.

* * * * *